United States Patent

[11] 3,602,730

[72] Inventor Charles R. Cushing
New York, N.Y.
[21] Appl. No. 64,118
[22] Filed July 30, 1970
[45] Patented Aug. 31, 1971
[73] Assignee Sea-Land Service, Inc.
Elizabeth, N.J.
Continuation of application Ser. No.
757,024, Sept. 3, 1968, now abandoned.

[54] POWER SUPPLY BOX
10 Claims, 11 Drawing Figs.
[52] U.S. Cl..................................................... 307/150,
62/240, 114/72, 290/1
[51] Int. Cl...................................................... H02j 7/00
[50] Field of Search........................................... 307/149,
150, 151, 153; 290/1, 1.1, 1.2; 62/242, 240, 243;
114/72; 169/2

[56] References Cited
UNITED STATES PATENTS
2,210,896 8/1940 Brush ........................... 114/72 UX
2,789,234 4/1957 Lambert et al. ............... 290/1.1 UX
2,926,505 3/1960 White............................ 62/242
2,972,975 2/1961 White............................ 114/72
3,359,752 12/1967 Westling et al. .............. 62/240 X Primary Examiner—Herman J. Hohauser
Attorney—David Rabin ABSTRACT: A containerized portable power supply for providing electrical service to a plurality of consistently sized and shaped cargo storage containers stowed in vertical tiers and horizontal rows within retaining structures on the ship deck and within the ship hold, the power supply including a housing conforming substantially to the shape and size of the cargo storage containers so that the power supply may be interchangeably positioned within the stowed containers, a motor-generator combination for generating electricity to serve the needs of the cargo storage containers stowed aboard ship, and a distribution system connecting the generating facilities with the cargo containers located at any number of locations remote from the power supply.

POWER SUPPLY BOX

This a continuation of U.S. application Ser. No. 757,024, now abandoned.

BACKGROUND, BRIEF SUMMARY AND OBJECTIVES OF THE INVENTION

Combined land and sea transportation systems have been generally described and referred to in U.S. Pat. Nos. 3,044,653; 2,991,108 and 3,027,025. The system embodies transfer between ships and land vehicles of cargo containers in the form of load-carrying trailers adapted for selective securement to the chassis of transport tractors and to structural members for storing these containers aboard ship in vertical stacks ad horizontal rows. The system offers numerous advantages in that the containers need not be unloaded at the pier and their contents carried individually aboard ship for storage and subsequent water transportation, but they may be lifted individually by gantry cranes especially equipped for such an operation from shore to the vessel and back again during the loading and unloading operations.

A great number of stowing devices are now in use such as those disclosed in U.S. applications Ser. No. 756,755, Abovedeck Container Storage Apparatus, filed Sept. 3, 1968; and Ser. No. 745,476, Freight Stowing Apparatus, filed July 17, 1968. The purpose of these various devices is to provide means for utilizing to the greatest advantage all storage space aboard ship to accommodate cargo containers in a secure and nonshiftable manner. Since all available space is used for storage of the containers, it is in many cases necessary to provide electrical service to some of the containers particularly when refrigerated treatment of the container contents is necessary.

Conventionally, the electrical power necessary for providing service to operate the refrigerating systems of the various containers has been made available through the generating facilities of the ship, however, this procedure has in many ways proven to be undesirable since not only does it draw from the ship's needed resources but presents a rather impractical power system in that those containers most remote from the power source oftentime suffer from low voltage because of excessive line loss thus requiring expensive regulators or voltage-boosting devices to provide the proper electrical operating characteristics for refrigerating components.

The present invention seeks to eliminate these deficiencies of conventional practice by providing a power supply housed within a container structure so that it might be packaged or stowed within the vertical stacks and horizontal rows of containers as they are normally positioned on deck or in the hold of a ship for sea transportation. The size and configuration of this containerized power supply makes possible the loading and unloading as if it were another cargo container, this operation normally being accomplished by gantry cranes positioned on shore and adapted to handle these specially constructed cargo containers by means of spreader bars and the like. The provision of a power supply within a containerized housing offers an extremely important additional advantage in that the power supply may be positioned in the midst of horizontal rows and vertical stacks of conventional cargo containers so as to provide a centrally located power distribution system for those surrounding containers. The disadvantages inherent in a system whereby the containers are fed from one fixed source within the ship, namely, that of low voltage and excessive line loss resulting in faulty operation of the refrigeration equipment, is thus eliminated.

The invention comprises first a containerized portable power supply of the type referred to above having a containerized housing which conforms substantially to the shape and size of the cargo storage containers so that the power supply may be interchangeably positioned within the stowed containers. The housing is thus positionable by suitably adapted dockside gantry cranes which are designed for the handling of cargo containers from the shore to the vessel and back again during the loading and unloading operations. Additionally, the containerized housing of the power supply preferably contains a duplex motor-generator combination so that a pair of diesel engines drive a pair of generators, one engine and one generator being positioned at each end of the containerized power supply. The generated electricity is distributed from each end of the power supply housing through suitable conductors connecting a bus common to the generator terminals and the cargo container electrical system to be energized.

The invention is also an essential component of a combination electrical distribution system for a plurality of stowed cargo containers wherein the power supply is centrally positioned within the stacked and stowed containers and electrically connected to the containers to provide a balanced load and voltage electrical service for the electrical apparatus of the connected cargo containers.

Lastly, the provision of a containerized power supply such as that described provides a novel method of loading a ship with freight-carrying cargo containers while providing electrical service to those containers once they have been loaded since conventional electrical service for stowed freight has been by means of the ship's power supply through relatively inefficient procedures. The method of supplying power to a plurality of consistently sized and shaped cargo containers involves the ability to position the portable power supply substantially in the center of the stowed shipboard containers in a space which is normally adapted for occupancy by such a container. The connection of such a stowed container to its surrounding cargo containers and the provision of electric power for the electrical requirements of each of the cargo containers provides a novel method heretofore unknown in the art.

From a consideration of the brief summary of the invention, it is apparent that a primary object of the present invention is to provide a containerized power supply of the type described which may be positioned aboard ship interchangeably with consistently sized and shaped cargo storage containers, the power supply being adapted for loading and unloading operations through conventional apparatus for handling the cargo containers and thus requiring no special considerations for transfer from the shore to the ship and back again during the loading and unloading operations.

Another object of the present invention is to provide a portable power supply of the type described having self-contained motor generating units of sufficient capacity to supply the electrical needs of a plurality of cargo containers requiring refrigeration, heating or other applications best served by electrical facilities and apparatus.

Yet another object of the present invention is to provide a containerized portable power supply having a housing which conforms substantially to the shape and size of conventional cargo storage containers so that a power supply may be interchangeably positioned within the stowed containers.

Yet still another object of the present invention is to provide a containerized power supply of the type described which includes a fire control system within the container housing in close proximity with the motor-generator combination to insure adequate safety features for shipboard operation.

Yet still a further object of the present invention is to provide a stowed cargo container distribution system powered by a power supply of the type described wherein the power supply is positioned within and electrically connected to a plurality of cargo storage containers and provides electrical service for the apparatus of each of the connected containers.

Yet still another further object of the present invention is to provide novel methods of loading a ship with freight-carrying cargo containers which includes the interspersing of power supplies of the type described and supplying power for a plurality of consistently sized and shaped cargo containers by positioning the containerized power supply of the type described substantially in the center of the stowed containers to provide a balanced load and voltage electrical service.

These and other objects of the present invention will become apparent from a consideration of the following detailed specification taken in conjunction with the accompanying drawings wherein like characters of reference designate like parts throughout the several views.

FIGURE DESCRIPTION

DETAILED DISCLOSURE OF THE INVENTION

Figure 1:
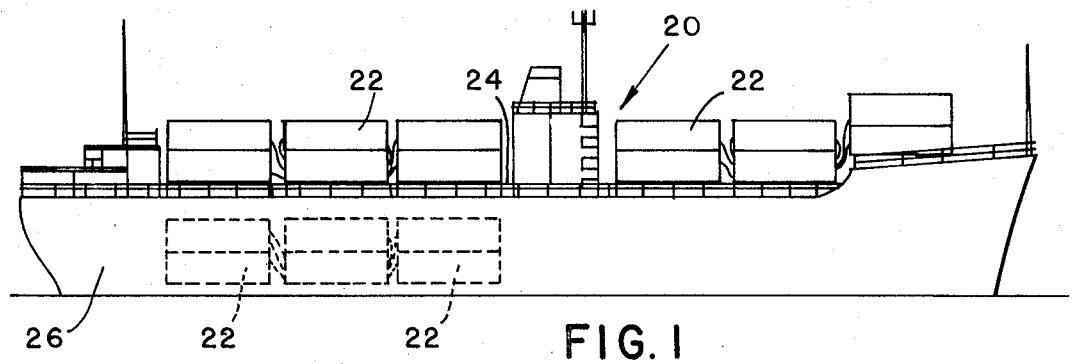
FIG. 1 is a side elevational sectional and schematic view of a cargo ship loaded with on and below-deck cargo containers electrically connected to a containerized power supply stacked within the container arrangement.

Referring now to the drawings and particularly to FIG. 1, a suitably designed cargo ship shown generally as 20 is loaded with a plurality of cargo storage containers 22 both on deck 24 and within the hold 26 in vertical tiers and horizontal rows in a manner similar to that disclosed in the patents previously mentioned.

Because of the considerable number of refrigerated containers commonly used in such a transportation system, and because these refrigerated units require electrical service for operating their various equipment, it is necessary to provide some source of power for this operation during the voyage at sea. Conventionally, this power source is simply the ship's power supply though numerous disadvantages are apparent from the use of such a system.

Figure 2:
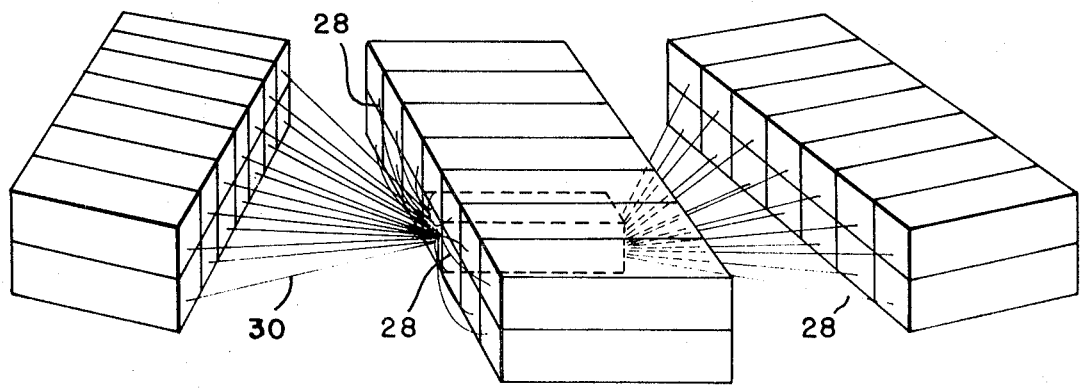
FIG. 2 is a perspective sectional and expanded view of a plurality of stacked cargo containers being served electrically by a centralized and containerized portable power supply.

It has been found that much more convenient and efficient electric service may be provided by furnishing a number of portable or auxiliary power supplies which may be conveniently positioned substantially in the center of an accumulation of stacked cargo containers such as is schematically shown in FIG. 2. There a centrally positioned power supply 28 serves a plurality of surrounding tiers and rows of cargo containers 22 through numerous electrical connections 30.

The provision of a novel portable power supply for serving shipboard cargo containers has additional advantages in that the power supply includes a housing 32 which conforms substantially to the shape and size of the cargo storage containers 22 so that the power supply may be interchangeably positioned within the conventionally stowed containers as shown in FIG. 2. A considerable number of devices to aid in loading and unloading cargo storage containers 22 are now in use. The containers are adapted with latching mechanisms cooperating with a gantry crane spreader bar which permits expeditious securement and release of the containers from the gantry crane for movement from shore to ship and back again during the loading and unloading operation. Additionally, the ease in handling the containers makes it possible to stack these containers aboard ship in novel buttressing structures which retain these containers securely during movement of the ship at sea, one of which is shown in U.S. Pat. application Ser. No. 745,476, for Freight Stowing Apparatus, filed July 17, 1968. Thus the provision of the housing 32 within which to place the power supply for serving the numerous surrounding cargo containers provides additional novelty in that it permits positioning of the power supply by conventional container handling means within any desired location aboard ship so that the most efficient electrical distribution system is available.

Figure 3:
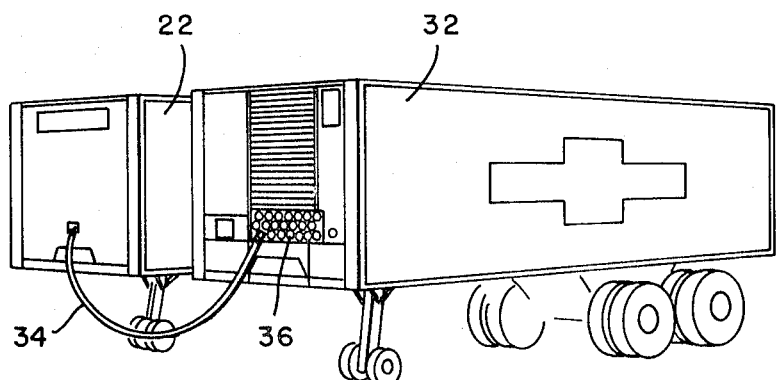
FIG. 3 is a perspective view of a containerized portable power supply embodying the present invention electrically connected to a cargo container for providing electrical service thereto.
Figure 8:
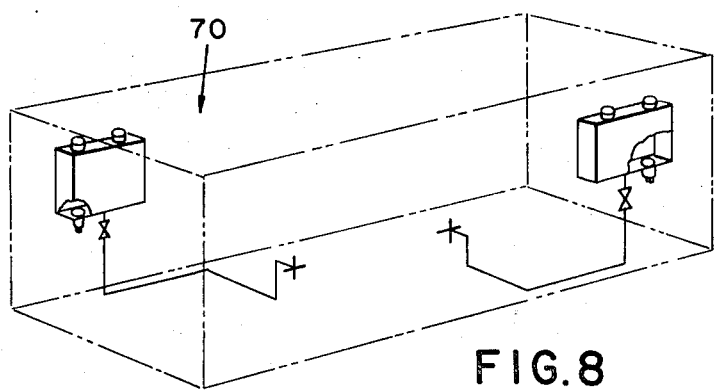
FIG. 8 is a diagrammatic schematic view of the lubricating oil distribution system of the containerized power supply.
Figure 5:
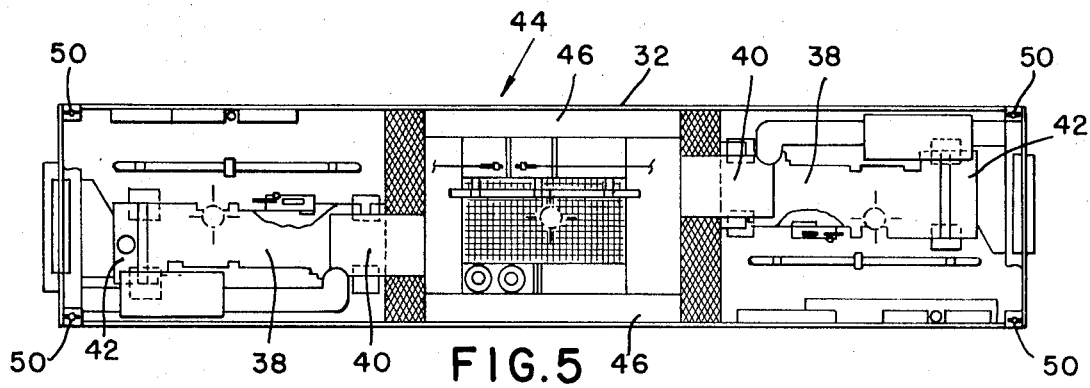
FIG. 5 is a plan view of the interior of the containerized power supply of FIG. 4.
Figure 4:
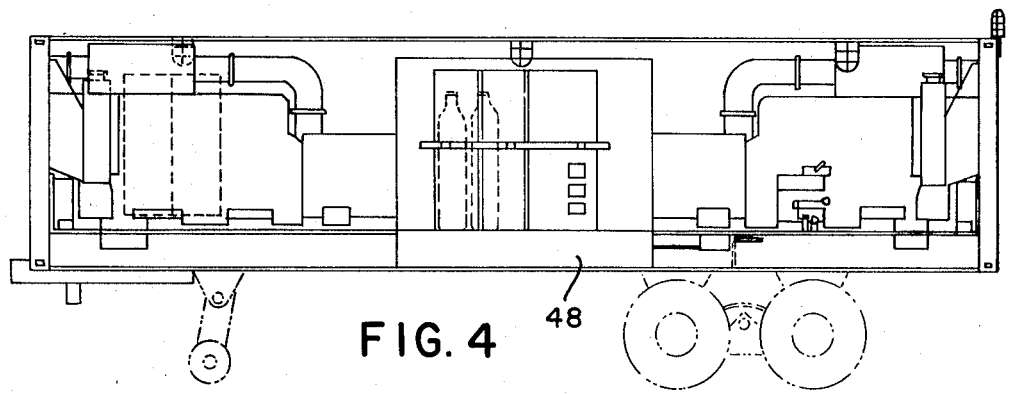
FIG. 4 is a side elevational sectional view of the interior of a containerized portable power supply showing the motor-generator units, the fuel reservoir and the carbon dioxide storage area.
Figures 6, 7:
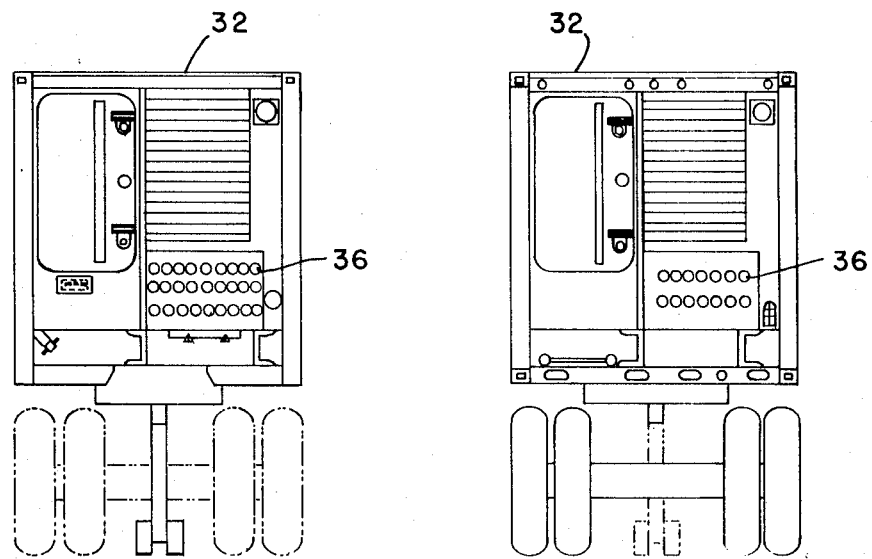
FIG. 6 is one end elevational view of the containerized power supply shown in FIGS. 4 and 5.
FIG. 7 is the other end elevational view of the containerized power supply shown in FIGS. 4 and 5.

The actual connections between the power supply and a cargo container 22 to be served is best shown in FIG. 3 where a bundled cable of electrical conductors 34 extends from the container to be serviced to the power supply and is secured thereto by insertion within one of a plurality of sockets 36 exposed on the end surface of the housing 32. Thus electrical connection can be expeditiously accomplished by merely extending the service cable from the particular container 22 to the power supply for removable socketed connection thereto.

The power supply is carried within housing 32 and includes in preferred form a pair of diesel engines 38 driving cooperating and connected generators 40 through appropriate connecting linkages. The cooperating pairs of engines and generators are preferably mounted in each end of the housing 32 and electrical outlets 36 are installed at each end of the housing to offer electrical service to containers positioned on either end of the power supply. Each of the engines is provided with a cooling system having a radiator and fan 42 of conventional construction. The various controls for motor speed and adjustment as well as other throttling devices are provided.

To insure an adequate supply of fuel for an ocean voyage, a substantially U-shaped fuel tank shown generally as 44 is positioned centrally of the housing 32 and includes particularly two vertically stacked tanks 46 and a horizontally positioned subfloor tank 48, the fuel tank 44 having appropriate and conventional feeding means to each of the diesel engines 38.

The power provided may be of any convenient voltage depending on the electrical characteristics of the equipment used within the refrigerating components. Preferably, both three-phase and single-phase service is provided so that either service may be obtained through the conduit socket 36 if needed.

The housing 32 is provided with a plurality of twist lock slots at each upper and lower corner which will receive a movable twist lock (not shown) therein so that the container may be either lifted by a crane or locked in close proximity with other containers above and below the housing as desired. The ability of the power supply to be handled by conventional container-handling apparatus is a decided advantage in positioning that power supply at the best location for providing electrical service.

Figure 10:
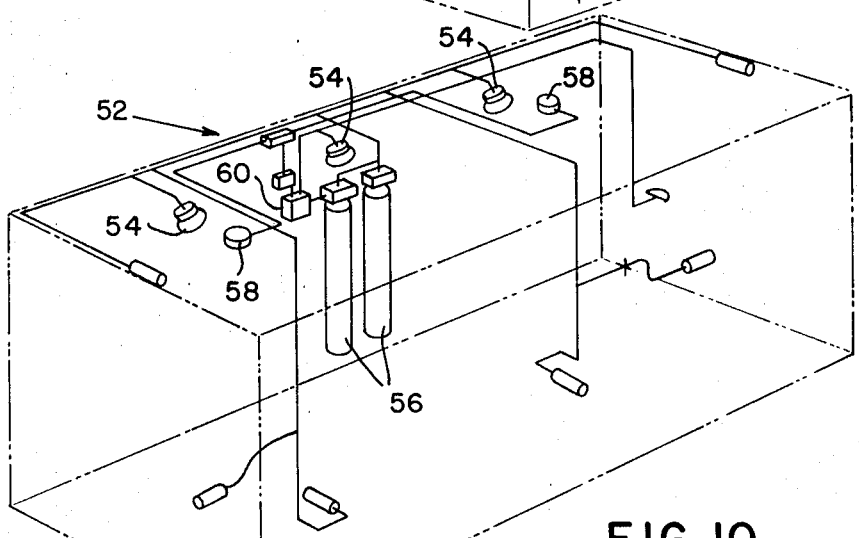
FIG. 10 is a diagrammatic schematic and perspective view of the fire extinguisher system associated with interior of the containerized power supply housing.

To provide maximum safety in the operation of the auxiliary power supply, a fire-extinguishing system shown generally in schematic form in FIG. 10 as 52 is included within housing 32 utilizing a plurality of multijet carbon dioxide nozzles 54 located over the fuel tanks and the engine-generator units which ejects $CO_2$ from $CO_2$ storage bottles 56 to combat any fire which might develop. Suitable sensing devices such as those indicated as 58 actuate the fire-extinguishing system when the heat inside the housing 32 reaches some predetermined and preset level or other malfunctioning of the related equipment takes place. The system is critically controlled by an automatic control head and internal release 60 to insure against untimely operation.

Figure 11:
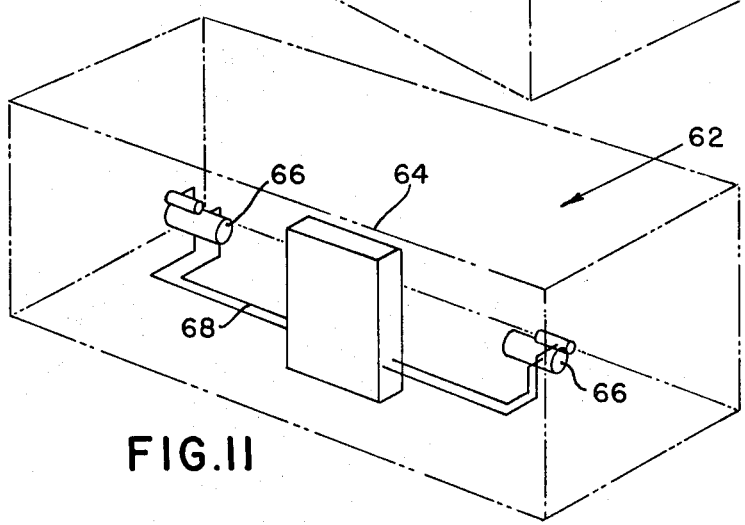
FIG. 11 is a diagrammatic schematic and perspective view of the hydraulic cranking system used to provide starting service for the motors of the containerized power supply.

A hydraulic cranking system shown generally as 62 in FIG. 11 is used to initiate the operation of the diesel engines and includes a control panel 64 operably connected to two hydraulic cranking motors 66 associated with each of the diesel engines 38 by flexible hosing 68 for high and low pressure fluid flow.

A lubricating oil makeup tank shown generally as 70 serves to furnish an oil supply for the continuously operating diesel engines and, where possible, the responsive generators.

Figure 9:
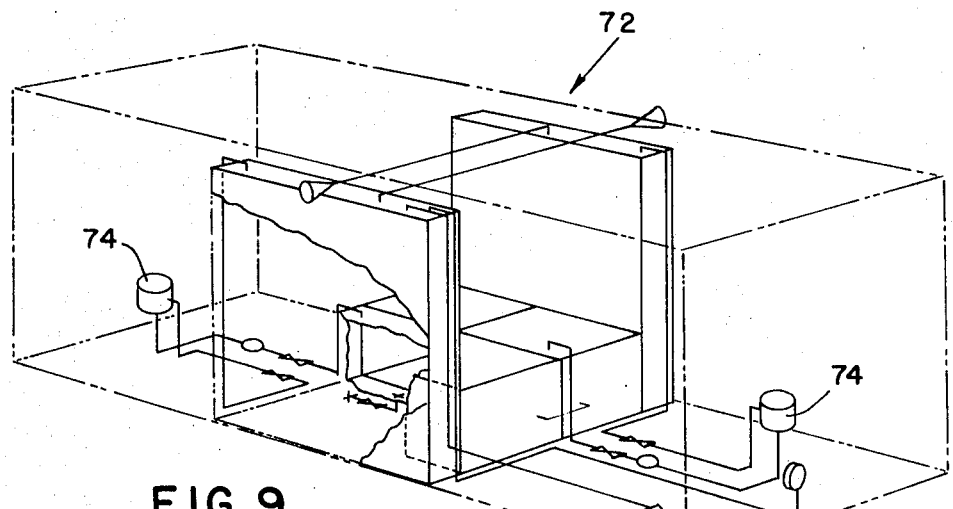
FIG. 9 is a diagrammatic schematic and perspective view of the fuel system of the containerized power supply.

The fuel system for the driving diesel engines 38 is indicated generally and schematically as 72 in FIG. 9, and the system includes six interconnected tanks forming a U-shaped tank member having at least 1500 gallons capacity. Conventional fuel filters 74 are provided, one for each engine, and the interconnected tanks insure continuous fuel supply to each of the operating engines so long as any fuel remains within the various tanks.

It will be readily apparent that an immediate and extremely beneficial advantage derived from using a centrally positionable auxiliary power supply such as that herein described is that the power supply can be located substantially within the center of the stowed cargo containers in a space normally adapted for occupancy by such a container because the housing 32 is similar structurally and functionally to that of a conventional cargo container 22.

When each of the stowed shipboard containers are electrically connected to the power supply, the distance involved in providing service to each container is rather consistent, the power supply serving the surrounding containers radially to distances not differing by significant amounts. This is in direct contrast with conventional system wherein the stored cargo containers are supplied from the ship's power supply since those containers most remote from the ship's power supply will likely suffer from line loss and voltage drop, these conditions directly affecting the operation and life of the electrical apparatus involved. In the present unique method for providing electrical service on board ship for cargo containers by means of a centrally positioned portable power supply, a balanced load and voltage electrical service for each of the connected cargo containers from the centrally located power supply is achieved.

Thus there has been described a novel apparatus for providing electrical service to a plurality of cargo containers stored aboard ship for transportation thereon, a novel combination including a portable power supply centrally positioned in the midst of a plurality of stacked and prearranged cargo containers, and a novel method for loading and providing electrical service to a plurality of cargo containers stored aboard ship in a predetermined configuration. Obviously, many modifications and variations may be made in the construction of the power supply and the arrangement of the power supply within the sorted cargo containers as well as other phases of the present inventive concept in light of the above teachings without departing from the real spirit and purpose of this invention. Such modifications of parts as well as the use of mechanical equivalents to those herein illustrated are contemplated.

I claim:

1. A containerized portable power supply for providing electrical service to a plurality of consistently sized and shaped cargo storage containers stowed aboard ship in vertical tiers and horizontal rows within retaining structures carried on the ship deck and within the ship hold by suitably adapted dockside gantry cranes, the power supply comprising: a housing conforming substantially to the size and shape of the storage containers for stacking interchangeably therewith; generating means carried within said housing; motor means within said housing operable to activate said generating means; and means including a plurality of discrete, electrical supply sources distributing individually through electrical conductors generated power directly to storage containers at remote locations to provide balanced load and voltage electrical service to each of the containers.

2. A power supply as claimed in claim 1, said motor means including container-centralized fuel storage means and at least one fuel-consuming motor operably and controllably driving said generating means.

3. A power supply as claimed in claim 1, further comprising a fire-control system within said housing in close proximity with said generating means and said motor and fuel-storage means.

4. A power supply as claimed in claim 1 in combination with a plurality of stowed cargo containers wherein the power supply is positioned within and electrically connected to the containers and provides electrical service for each of the connected containers.

5. A power supply as claimed in claim 3, in combination with a plurality of stowed cargo containers wherein the power supply is positioned within and electrically connected to the containers and provides electrical service for each of the connected containers.

6. A power supply as claimed in claim 1 wherein the interchangeable housing is positionable by suitably adapted dockside gantry cranes.

7. A power supply as claimed in claim 1, said motor means including container-centralized fuel-storage means and at least one fuel-consuming motor operably in controlling driving said generating means, said distributing means including at least one conductor electrically connecting said generating means with at least one cargo container at a remote location; said power supply further comprising a fire-control system within said housing in close proximity with said generating means and said motor and fuel-storage means, said interchangeable housing being positionable by the suitably adapted dockside gantry cranes.

8. A power supply as claimed in claim 6 in combination with a plurality of stowed cargo containers wherein the power supply is positioned within and electrically connected to the containers and provides electrical service for each of the connected containers.

9. In a ship for conveying freight in cargo containers which are individually mounted on a wheeled trailer chassis for land travel and removable therefrom for stacking aboard ship in vertical tiers and horizontal rows, at least some of the containers being provided with electrically operated apparatus and others being provided with self-contained powerplants each of the powerplants having engine-powered generators for supplying electrical energy to at least one power outlet, the method of loading a ship with freight-carrying cargo containers comprising the steps of: loading a predetermined number of cargo containers on a ship in vertical tiers and horizontal rows with at least some of the containers having self-contained apparatus to be electrically powered; positioning at least one electrical supply powerplant having a power outlet in juxtaposition with said predetermined number of cargo containers; electrically connecting the electrically operated apparatus carrying containers to a power outlet of powerplant containers; and supplying electrical power from the powerplant container to the electrically operated apparatus of the carrying containers.

10. A method of supplying power to a plurality of consistently sized and shaped cargo storage containers adapted for serving as trailers for overland motor tractors and stowing above and below deck of a cargo ship in a tiered and side-by-side relationship within retaining structures carried by the ship hold and deck, the method comprising the steps of; providing a portable power supply within a consistently sized and shaped cargo container such as those stowed in a ship hold and on deck; positioning the portable power supply substantially in the center of the stowed ship for containers in a space adapted for normal occupancy by such a container; connecting each of the stowed shipboard containers electrically to the power supply; and providing balanced load and voltage electrical service for each of the connected cargo containers from the centrally located portable power supply.